Figure 1:
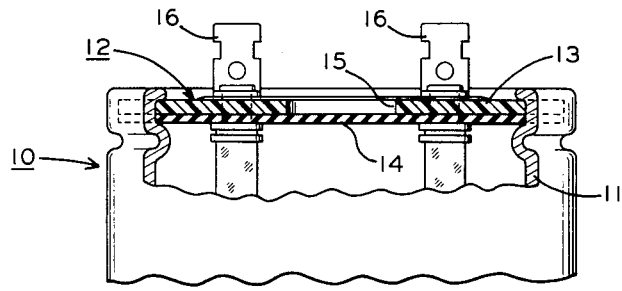

Aug. 3, 1965   J. H. FABRICIUS   3,198,997
CAPACITOR HAVING A PRINTED PLURAL RESISTOR
PATTERN BETWEEN TERMINALS
Filed Dec. 17, 1959

JOHN H. FABRICIUS
*INVENTOR.*

BY *Connolly and Hutz*

HIS ATTORNEYS

United States Patent Office 3,198,997
Patented Aug. 3, 1965

3,198,997
CAPACITOR HAVING A PRINTED PLURAL RESISTOR PATTERN BETWEEN TERMINALS
John H. Fabricius, Stamford, Vt., assignor to Sprague Electric Company, North Adams, Mass., a corporation of Massachusetts
Filed Dec. 17, 1959, Ser. No. 860,193
2 Claims. (Cl. 317—230)

This invention relates to a resistor pattern of multiple resistances for capacitor covers, and more particularly to a plurality of resistance paths on the closure member of a capacitor which is provided with an escape vent.

It is a conventional practice to use capacitors for providing sufficient torque power in the starting of an electric motor. The energy that is necessary to start a motor is substantial and it has become customary to employ an electrolytic capacitor to provide the electrical energy for starting electric motors. The capacitors employed are referred to as A.C. motor-start electrolytics. An electric motor and its A.C. motor-start electrolytic capacitor are in cooperative relationship through a centrifugal switch. The centrifugal switch is constructed and mounted so that when the motor exceeds a predetermined speed the capacitor is cut out of the power supply circuit, in other words, disconnected. One of the difficulties encountered in this combination of motor, switch, and capacitor is the reconnecting of the switch on the deceleration of the motor. After the power has been cut off and the motor passes below the speed at which the centrifugal switch opens, the circuit to the capacitor and the capacitor are brought back into the power supply circuit. The relationship of the parts, therefore, is such as to reconnect the capacitor into the power supply circuit as the motor comes to a stop. In the period when the motor slows down with the capacitor connected into the circuit, the alternating current cycle is applied across the capacitor. If the capacitor has been thrown out of the circuit at one of the peaks in the alternating current cycle on the starting of the motor, a full charge is present across the capacitor electrodes. When the capacitor is returned to the circuit by the opening of the switch, this full charge discharges across the switch. This type of high energy discharge across the switch leads to arcing between the contacts of the switch and this arcing reduces the life of the switch by causing a degradation of the contacts.

In the treatment of this problem the prior art has positioned a resistor across the terminals of the capacitor, which resistor will allow the full charge to bleed off, if there is one present across the capacitor electrodes as a result of the capacitor being thrown out of the circuit at one of the peaks in the alternating current cycle.

A motor-start electrolytic capacitor requires a cover for closure of the capacitor-containing casing. The cover is preferably provided with a suitable vent. This vent is adapted to yield under minor pressures within the capacitor and to rupture under major pressures. The vent is provided with a small yieldable member which can expand or rupture under the pressure of internal gases within the capacitor. The positioning of this yieldable member on the cover is important to the proper operation of this type of capacitor. The passageway or opening for the yieldable member presented in the cover must be of sufficient size to allow a substantial release of pressure by expansion without rupture. Thus it will be possible to permit predictability in calculating the release pressure of the vent.

The cover member must be provided with passageways for the capacitor terminals, and the vent opening further weakens the structure. It is desirable to avoid unessential openings and it is also important to position openings in the cover so as to provide the greatest possible strength to the cover. For these reasons it is desirable to provide as much separation as possible between openings in the cover. The positioning of printed resistance paths on the cover is an obstacle to the optimum placement of vents in the capacitor cover.

The resistors that are positioned on the capacitor cover to bleed off the charge between the terminals are preferably compact and simple in construction so as to be readily adapted to the manufacture of the capacitor component. A printed resistance path on the outer surface of the cover between the terminals will provide such a bleed-off function, but with conventional capacitor covers the conventional printed resistances develop troublesome problems. The heat generated by the passage of current through the resistance path or paths must not result in degradation of the cover material since the life of the capacitor can be deleteriously affected.

It is the object of this invention to provide a capacitor cover having an optimum arrangement of printed resistance paths and pressure release means.

It is another object of this invention to provide a means for permitting the bleed off of the charge between the terminals of a capacitor while controlling the generation of heat.

It is a further object of this invention to provide a capacitor cover for discharging the electrical charge between the terminals of a capacitor by a resistance means adapted to provide uniform heat dissipation over a maximum area while permitting the optimum positioning of a release vent in the cover.

Figure 2:
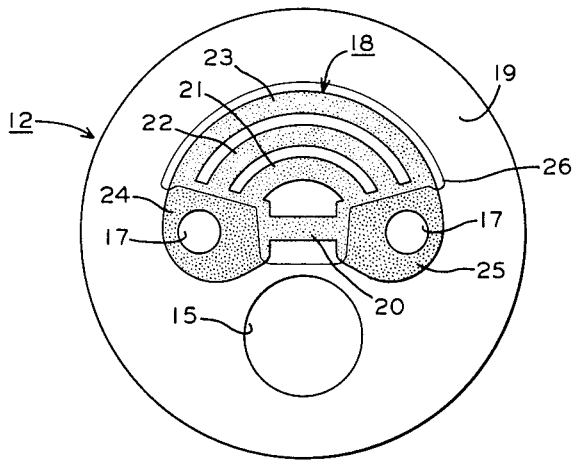
Figure 3:
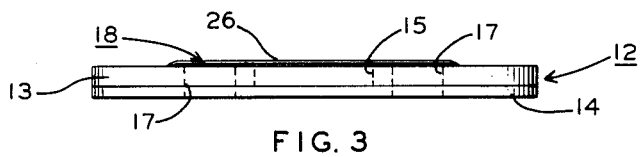

These and other objects of the invention will become apparent upon consideration of the description taken together with the accompanying drawing, in which:

FIGURE 1 is a side view partially in section of the upper end of a motor-start capacitor, FIGURE 2 is a plan view of a preferred embodiment of the multiple path printed resistor of this invention in a preferred disposition on a capacitor cover, and FIGURE 3 is a side elevational view of the resistor and cover of FIGURE 2.

The objects of this invention are attained by depositing a multiple path resistance pattern between the terminals of a capacitor cover wherein each path has a discrete resistivity and/or thickness to dissipate a controlled watts per square inch over a maximum area so as to maintain a constant temperature over the surface of the cover.

In a more restricted sense, the objects of this invention are attained by dispositing a multiple path resistance pattern between the terminals of a capacitor cover wherein there is equal heat dissipated in each path. The heat dissipation per square inch in the paths is controlled to accommodate the greater radiation from the path closest to the periphery of the cover.

In a still more restricted sense, this invention provides a multiple path pattern of resistances on the cover of a capacitor in which the resistance pattern is placed at one side of the cover surface, so as to provide means for bleeding-off any electrical charge across the capacitor terminals, and also to provide a clear area on the cover surface for locating an adequate vent for the relief of internal pressure within the capacitor can. In the multiple path pattern, each path has a specific resistivity of sufficient resistance to provide a dissipation of a uniform loss of energy in watts per square inch over a maximum area. Each of the paths is designed to give controlled heat dissipation per square inch of resistor surface. A large vent hole is positioned in the cover surface in a location removed from the resistor paths and capacitor terminals.

Referring to the preferred embodiment depicted in the drawing, FIG. 1 shows a capacitor 10 such as an electrolytic capacitor having a casing 11 which has a cover 12 mounted in its open end. The cover 12 is suitably secured in casing 11 by a metal working operation which crimps a groove under cover 12 and spins-over the upper rim of casing 11 onto cover 12.

The cover 12 is the combination of a relatively stiff member 13, composed of a suitable electrical insulation material such as a formaldehyde resin, and on the underside of member 13 a pliable elastic sheet 14, such as a rubber material. A vent opening 15 provided in member 13 is closed by the impermeable sheet 14. A pair of terminals 16 are shown extending through cover 12 to provide for suitable electrical connection to the capacitor within casing 11.

In the plan view of the cover 12 shown in FIG. 2, a pair of openings 17 for the respective terminals 16 are shown centrally positioned in the cover 12. The vent opening 15 on the other hand is positioned to one side of the cover 12. A resistor pattern 18 is shown applied to the surface 19 of the cover and connecting the respective terminals 16 and is arranged to one side of the surface 19 and away from the vent opening 15. The resistor pattern 18 illustrated in FIG. 2 is made up of a plurality of resistor paths 20, 21, 22, and 23 extending from terminal areas 24 and 25 to which the respective ends of each of the paths are connected. Thus there are provided multiple paths for the discharge of electrical energy from one terminal to the other.

FIGURE 3 in a side view shows the superimposed relationship existing between sheet 14, stiffening member 13, resistor pattern 18, and vent opening 15 shown in dotted lines. It is also seen, as shown in dotted lines, that the terminal openings 17 extend through all three successive layers. A protective coating 26 is applied over the paths 20, 21, 22, and 23 leaving terminal areas 24 and 25 uncovered for contact with the respective terminals 16.

The paths 20, 21, 22 and 23 are deposited onto the surface 19, and may be made up of a screened-on resistive ink. The resistance of each path is adjustable to the specific path. This resistance is adjusted either by varying the resistivity of the ink composing the particular path, or by varying the thickness of the ink. The resistivities of the respective paths are adjusted with relation to each other so that in each path the resistance is such that there is uniform watts/sq. in. of dissipation in a maximum total area covered by the pattern 18 as a whole. Thus there is a controlled heat dissipation along the various paths; and with this controlled uniformity, an avoidance of any hot spot development. It will be seen that the resistance of the paths varies inversely with the length of the path for a given resistivity of the path-forming material, i.e. ink. The distribution of the paths of energy dissipation over separate areas of varying lengths serves to insure the equal heat dissipation per square inch of resistor surface.

The surface 19 is divided into two semicircular parts by the terminal openings 17. The pattern 18 places the bleed-off resistor all on one half of the cover surface to provide free area on the other half to locate the vent. The arcuate shape of paths 21, 22, and 23 is adapted to provide disposition of maximum length plural paths.

As a result of this construction a cover is provided which may be composed of poor thermal conductivity material, such as phenolics, and carrying a bleed-off resistor which is printed on the surface of the cover in such a manner as to avoid the creation of hot spots and consequent burning of the phenolic. Further, the resistor which is screened on the cover is simple of construction and easy to apply. As a result it does not interfere with the normal operation of the capacitor nor otherwise encumber the cover. A further advantage of the resistor screened on the cover is its low cost in materials and in application.

Having described my invention in one of its preferred embodiments and having given an illustration of the use and effect of the same, I claim as my invention all that is commensurate with the spirit and scope of the following claims.

What is claimed is:

1. An electrical capacitor cover for closing a capacitor casing, said cover having two layers, the first of said layers being of relatively rigid organic plastic dielectric material, the other of said layers being of resilient dielectric material underlying said first layer, a pair of spaced openings extending through said cover for receiving capacitor terminals, an additional aperture through said first layer disposed laterally of said pair of openings for allowing expansion of said second layer therethrough, a resistive coating having multiple spaced paths of unequal length on the surface of said first layer connecting said openings and disposed laterally of said openings opposite said aperture, the resistance of each respective path being less than the resistance of the next adjacent shorter path.

2. An electrical capacitor comprising a container having an open end, a capacitance section having at least two electrodes positioned within said container, an electrolyte in said section and capable of generating gas upon the application of electrical stress to said section, a two layer cover closing said open end, the first of said layers being of a relatively rigid organic plastic dielectric material, the other of said layers being of resilient dielectric material underlying said first layer, a pair of spaced terminals extending through said cover in electrical contact with said electrodes, an aperture through said first layer disposed laterally of said pair of terminals for allowing expansion of said second layer therethrough upon the generation of gas by said electrolyte, a resistive coating having multiple spaced paths of unequal length on the surface of said first layer connecting said terminals and disposed laterally of said terminals opposite to said aperture, the resistance of each respective path being less than the resistance of the next adjacent shorter path.

References Cited by the Examiner

UNITED STATES PATENTS

| | | | |
|---|---|---|---|
| 1,924,606 | 8/33 | Hammond | 317—231 X |
| 2,125,373 | 8/38 | Georgiev | 317—230 |
| 2,473,183 | 6/49 | Watson | 338—308 |
| 2,611,040 | 9/52 | Brunetti | 317—101 |
| 2,772,380 | 11/56 | Andrew | 317—101 |
| 2,812,471 | 11/57 | Jarboe | 317—101 |
| 2,940,018 | 6/60 | Lee | 317—101 |
| 2,962,393 | 11/60 | Ruckelshaus | 338—308 |

FOREIGN PATENTS 651,988    4/51    Great Britain.

DAVID J. GALVIN, *Primary Examiner.*

SAMUEL BERNSTEIN, *Examiner.*